(12) United States Patent
Hong et al.

(10) Patent No.: US 7,099,064 B2
(45) Date of Patent: *Aug. 29, 2006

(54) ELECTROSTATIC-TYPE VARIABLE DIFFRACTIVE LIGHT MODULATOR AND MANUFACTURING METHOD THEREOF

(75) Inventors: Yoon-Shik Hong, Kyunggi-do (KR); Dong-Ho Shin, Seoul (KR); Jong-Hyeong Song, Kyunggi-do (KR); Yoon-Joon Choi, Kyunggi-do (KR); Yurlov Victor, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 15 days.

This patent is subject to a terminal disclaimer.

(21) Appl. No.: 10/952,245

(22) Filed: Sep. 28, 2004

(65) Prior Publication Data

US 2005/0270622 A1    Dec. 8, 2005

(30) Foreign Application Priority Data

Jun. 3, 2004    (KR) .................. 10-2004-0040384

(51) Int. Cl.
*G02B 26/00*    (2006.01)

(52) U.S. Cl. ............ 359/290; 359/291; 359/292; 359/224; 359/298; 359/303; 359/318

(58) Field of Classification Search ........... 359/223, 359/224, 290–292, 295, 298, 303, 318
See application file for complete search history.

(56) References Cited

U.S. PATENT DOCUMENTS 5,311,360 A    5/1994    Bloom et al.
2005/0243401 A1*    11/2005    Yun ..................... 359/290

FOREIGN PATENT DOCUMENTS

KR    2000-7014798    6/2001

* cited by examiner

*Primary Examiner*—Evelyn A. Lester
(74) *Attorney, Agent, or Firm*—Christensen O'Connor Johnson Kindness PLLC

(57) ABSTRACT

Disclosed herein are an electrostatic-type variable diffractive light modulator, which includes lower micromirrors that are provided on a glass substrate to be spaced apart from each other, and actuates upper micromirrors that are spaced apart from the substrate by an electrostatic actuating method, thus allowing the upper and lower micromirrors to diffract incident light entering a lower portion of the substrate, and a method of manufacturing the electrostatic-type variable diffractive light modulator.

11 Claims, 13 Drawing Sheets

ELECTROSTATIC-TYPE VARIABLE DIFFRACTIVE LIGHT MODULATOR AND MANUFACTURING METHOD THEREOF

BACKGROUND OF THE INVENTION

1. Field of the Invention

The present invention relates generally to a variable diffractive light modulator and a manufacturing method thereof, and more particularly, to an electrostatic-type variable diffractive light modulator, which includes lower micromirrors that are provided on a glass substrate to be spaced apart from each other, and actuates upper micromirrors that are spaced apart from the substrate by an electrostatic actuating method, thus allowing the upper and lower micromirrors to diffract incident light entering a lower portion of the substrate, and to a method of manufacturing the electrostatic-type variable diffractive light modulator.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase only filter, an optical logic gate, a light amplifier, an image processing technique, an optical device, and a light modulator using a spatial light modulation theory.

The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1.

The modulator 10 is disclosed in U.S. Pat. No. 5,311,360 by Bloom et al.

The modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16.

Subsequently, a sacrificial silicon dioxide film 12 and a low-stress silicon nitride film 14 are deposited. The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced.

Accordingly, in the undeformed state, the modulator 10 acts as a plane mirror when it reflects incident light. In FIG. 2, reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda_o/4$.

The total round-trip path difference is a half of a wavelength, and light reflected from the deformed ribbon 18 and light reflected from the substrate 16 are subjected to destructive interference.

The modulator diffracts incident light 26 using the interference. In FIG. 3, reference numerals 28 and 30 denote light beams diffracted in +/− diffractive modes ($D_{+1}$, $D_{-1}$) in the deformed state, respectively.

It has been proven that sticking of the ribbon 18 to the substrate 16 is a common problem of the light modulator 10 during a wet process applied to form a space under the ribbon 18 and during operation of the modulator 10.

There are various methods of reducing the sticking: lyophilization, a dry etching of a photoresist-acetone sacrificial layer, an OTS single layer treatment, use of a hard ribbon and/or a tightened nitride film gained by shortening the ribbon, a method of roughing or wrinkling one or both surfaces of two facing surfaces, a method of forming a reverse rail on the lower part of the ribbon, and a method of changing the chemical properties of the surfaces.

In a solid-state sensor and actuator workshop held in June, 1994 at the Hilton Head Island in Scotland, prevention of sticking was reported, which is accomplished by reducing the contact area by forming a reverse rail on the lower part of a bridge and by employing a rough polysilicon layer as disclosed in "a process of finely treating the surface of a deformable grating light valve for high resolution display devices" suggested by Sandeyas, et al., and "a grating light valve for high resolution display devices", suggested by Apte et al.

Moreover, Apte et al. found that mechanical operation of the modulator 10 has a characteristic such that deformation of the ribbon 18 as a function of voltage forms hysteresis.

The hysteresis is theoretically based on the fact that an electrostatic attractive force between the ribbon 18 and substrate 16 is a nonlinear function of the deformation, whereas hardness of the ribbon 18 is a substantially linear function of a resilient force by tension.

FIG. 4 is a graph illustrating light output (which indirectly indicates the deformation of the ribbon 18) as a function of a voltage between the ribbon 18 and substrate 16, which shows an induced hysteretic characteristic.

Accordingly, when the ribbon 18 is deformed into a down position to come into contact with the substrate 16, they are latched and require a holding voltage smaller than the original applied voltage.

U.S. Pat. No. 5,311,360 by Bloom et al. discloses a latching feature which gives a modulator 10 advantages of an active matrix design without the need for active components.

Additionally, Bloom et al. describes that this feature is valuable in low power applications where efficient use of available power is very important.

However, Bloom et al. discloses the addition of small ridges below ribbons 18 to reduce a contact area, thereby reducing the sticking problem.

However, since the substrate of the modulator 10 is used as an optical surface, a process of adding the small ridges to the surface is complicated in that a reflective element of the substrate 16 must be smooth so as to have high reflectance and must be positioned on a planar surface of the ribbon 18.

Typical display devices are formed in 2-D arrays of pixels. Discontinuous images formed by a plurality of pixels are integrated by user's eyes, thereby forming an aggregate image of pixels constituting a whole image.

Unfortunately, prices of such a display device are high because the pixels are overlapped to form a complete array, so the production cost of each pixel is duplicated.

The display device comprising pixels is exemplified by televisions or computer systems. Their pixels may be formed by an LCD device or a CRT device.

Accordingly, there is required a diffractive grating light valve capable of reducing or removing the sticking between the reflective element and the substrate without a complicated surface treatment adopted to reduce the sticking.

As well, a display device is required, which reduces the number of pixels to reduce production costs without reducing image quality while designing a system.

To satisfy the above requirements, a conventional improved technology is proposed in Korean Pat. Application No. 10-2000-7014798, entitled "method and device for modulating incident light beam to form 2-D image", by Silicon Light Machines Inc.

In the "method and device for modulating the incident light beam to form the 2-D image", the diffractive grating light valve includes a plurality of elongate elements each having a reflective surface.

The elongate elements are arranged on an upper side of a substrate so that they are parallel to each other, have support ends, and their reflective surfaces lie in array (GLV array).

The elongate elements form groups according to display elements. The groups alternately apply a voltage to the substrate, resulting in deformation of the elements.

The almost planar center portion of each deformed elongate element is parallel to and spaced from the center portion of the undeformed element by a predetermined distance.

The predetermined distance is set to ⅓–¼ of the distance between the undeformed reflective surface and the substrate. Thus, the deformed elongate elements are prevented from coming into contact with the surface of the substrate.

Sticking between the elongate elements and the substrate is prevented by preventing contact between the elements and substrate. Additionally, the predetermined distance between each deformed elongate element and the substrate is limited so as to prevent hysteresis causing deformation of the elongate elements.

FIG. 5 is a side sectional view of an elongate element 100 of a GLV in an undeformed state according to a conventional improved technology.

In FIG. 5, the elongate element 100 is suspended above a surface of a substrate (including constitution layers) by ends thereof. In FIG. 5, reference numeral 102 denotes an air space.

FIG. 6 is a plan view of a portion of the GLV including six elongate elements 100. The elongate elements 100 have the same width and are arranged parallel to each other.

The elongate elements 100 are spaced close to each other, so that the elongate elements 100 can be deformed independently from other elements.

The six elongate elements 100 as shown in FIG. 6 preferably form a single display element 200. Therefore, an array of 1920 elongate elements forms a GLV array having 320 display devices arranged therein.

FIG. 7 is a front view of a display element 200 having undeformed elongate elements 100. FIG. 7 is a view taken in the direction of the arrows along the line A—A' of FIG. 5.

The undeformed state is selected by equalizing a bias on the elongate elements 100 to a conductive layer 106.

Since reflective surfaces of the elongate elements 100 are substantially co-planar, light incident on the elongate elements 100 is reflected.

FIG. 8 is a side sectional view of a deformed elongate element 100 of the GLV. FIG. 8 shows that the deformed elongate element 100 is maintained in the suspended state thereof to be spaced from the surface of the substrate adjacent therebeneath. This is in contrast to the conventional modulator of FIGS. 1 to 3.

Contact between the elongate element 100 and the surface of the substrate is prevented, thereby avoiding the disadvantages of conventional modulators. However, the elongate element 100 is apt to sag in the deformed state.

The reason is that the elongate element 100 is uniformly subjected to an electrostatic attractive force acting toward the substrate in directions perpendicular to a longitudinal direction thereof, whereas tension of the elongate element 100 acts along the length of the elongate element 100. Therefore, the reflective surface of the elongate element is not planar but curvilinear.

However, the center part 102 of the elongate element 100 (FIG. 8) is almost planar, making the contrast ratio of diffracted light, gained by only the center part 102 of the elongate element 100, desirable.

The substantially planar center part 102 has a length that is ⅓ of a distance between post holes 110. Hence, when the distance between the post holes 110 is 75 μm, the almost planar center part 102 is about 25 μm long.

FIG. 9 is a front view of the display element 200 in which the deformed elongate elements 100 are alternately arranged.

FIG. 9 is a view taken in the direction of the arrows along the line B—B' of FIG. 8. The elongate ribbons 100 which are not removed are maintained at desired positions by an applied bias voltage.

Deformation of the moving elongate ribbons 100 is achieved by alternate applications of operation voltages through the conductive layer 106 to the elongate elements 100.

A vertical distance ($d_1$) is almost constant to the almost planar center part 102 (FIG. 8), thereby limiting the grating amplitude of the GLV.

The grating amplitude ($d_1$) may be controlled by adjusting an operation voltage on the operated elongate elements 100. This results in precision tuning of the GLV in an optimum contrast ratio.

As for diffractive incident light having a single wavelength ($\lambda_1$), it is preferable that the GLV has a grating width ($d_1$) that is ¼ ($\lambda_o/4$) of the wavelength of incident light to assure a maximum contrast ratio in an image to be displayed.

However, the grating width ($d_1$) requires only a round trip distance that is the same as the sum of a half of the wavelength ($\lambda_1$) and the whole number of the wavelength $\lambda_1$) (i.e. $d_1=\lambda_1/4, 3\lambda_1/4, 5\lambda_1/4, \ldots, N\lambda_1/2+\lambda_1/4$)

Referring to FIG. 9, the lower side of each elongate element 100 is spaced upward from the substrate by a distance of $d_2$.

Accordingly, the elongate elements 100 do not come into contact with the substrate during operation of the GLV.

This results in avoidance of the sticking problems between the reflective ribbons and the substrate occurring in conventional modulators.

With reference to a hysteresis curve shown in FIG. 4, since the elongate elements 100 are moved by a distance that is ⅓–¼ of the distance between the elements and substrate to diffract incident light, hysteresis is prevented.

However, the conventional technology inevitably requires a gap between micromirrors to actuate the micromirrors with a ribbon shape. As the gap increases, a fill factor is reduced with respective to the same ribbon width. Hence, a maximum quantity of light which is diffracted to 0th or ±1st order becomes small, thus reducing a dynamic range of the light modulator.

According to the conventional technology, the light modulator has various pitches, according to adapted areas, including printing or displaying areas. The light modulator must minimize the gap between the micromirrors under a given pitch. In the case of a light modulator having a small pitch, a high fill factor is required to assure a sufficient modulation dynamic range, thereby a small gap is required. However, it is very difficult to form a small gap. Further, as the gap is reduced, the capacity of the device is deteriorated.

Further, the conventional technology is problematic in that the diffraction efficiency is lowered, and the uniformity of the output light of all pixels is thus lowered, when the actuating distance of three or four micromirrors provided in one pixel to be simultaneously actuated is not accurately regulated.

Furthermore, according to the conventional technology, the reflective micro ribbon is manufactured by placing a metal material on a dielectric material, such as silicon nitride. However, when a voltage is applied to the micro ribbon to supply an electrostatic force to the micro ribbon, the dielectric material is charged and thereby variation in an actuating displacement undesirably occurs.

SUMMARY OF THE INVENTION

Accordingly, the present invention has been made keeping in mind the above problems occurring in the prior art, and an object of the present invention is to provide an electrostatic-type variable diffractive light modulator, which includes lower micromirrors that are provided on a glass substrate to be spaced apart from each other, and actuates upper micromirrors that are spaced apart from the substrate by an electrostatic actuating method, thus allowing the upper and lower micromirrors to diffract incident light entering a lower portion of the substrate, and to a method of manufacturing the electrostatic-type variable diffractive light modulator.

In order to accomplish the above object, the present invention provides an electrostatic-type variable diffractive light modulator, including a light transmissive plate to transmit light; a plurality of first reflective plates attached to an upper surface of the light transmissive plate to be arranged in a row, each of the first reflective plates having a first reflective surface on a light transmissive plate contact surface thereof; a plurality of second reflective plates provided above the first reflective plates to be spaced apart from the first reflective plates at a predetermined interval while being arranged in a row, each of the second reflective plates having a second reflective surface to reflect incident light radiating below; and an actuating unit to actuate the second reflective plates using an electrostatic force so that the second reflective plates are moved between a first position wherein the first reflective surfaces and the second reflective surfaces form a plane mirror, and a second position wherein the first and second reflective surfaces diffract the incident light.

Further, in order to accomplish the above object, the present invention provides a method of manufacturing an electrostatic-type variable diffractive light modulator, including a first step of forming a lower electrode and a plurality of reflective plates through an exposure, after depositing a metal layer on a light transmissive material; a second step of depositing a sacrificial layer on the light transmissive material, and planarizing and etching the sacrificial layer; a third step of depositing a reflective metallic thin-film on a surface of the sacrificial layer; and a fourth step of eliminating the sacrificial layer formed at the second step.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
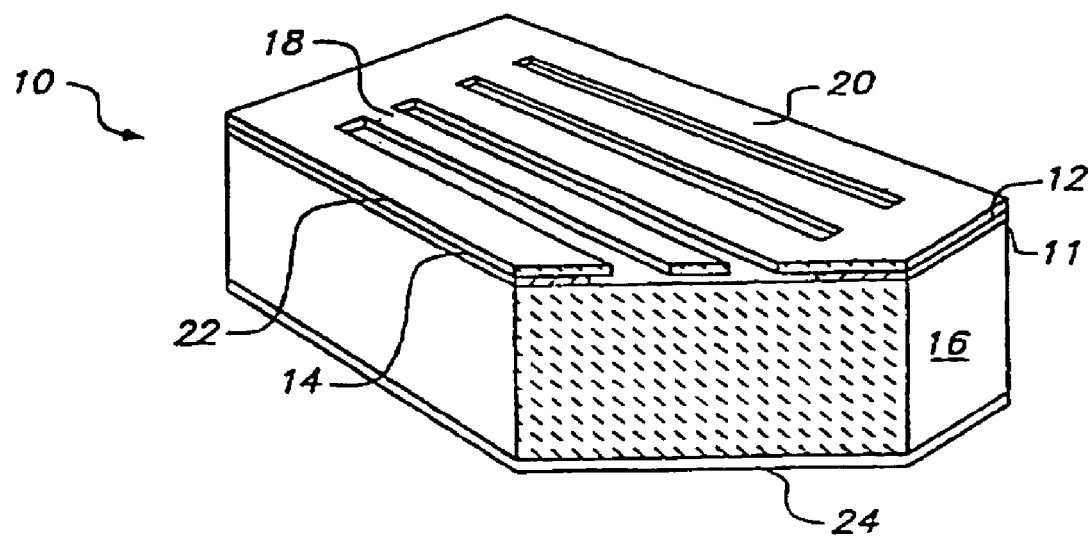
FIG. 1 illustrates a grating light modulator adopting an electrostatic manner according to a conventional technology.
Figure 2:
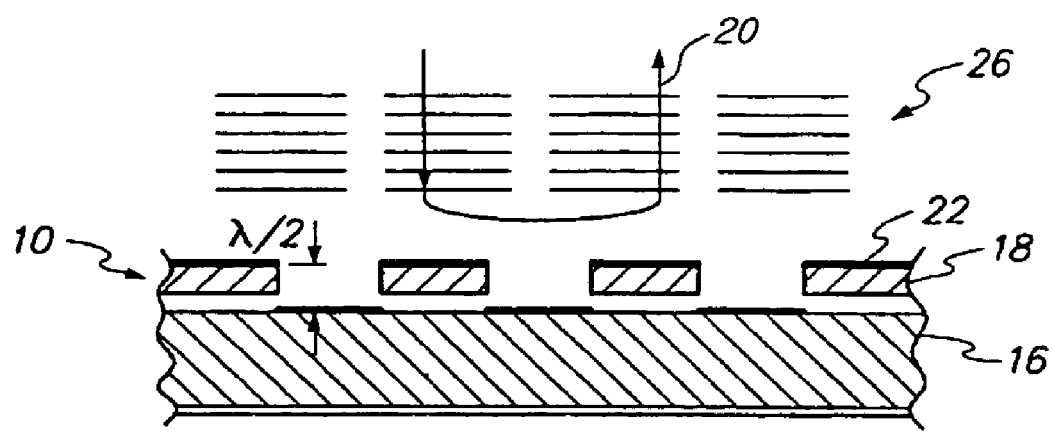
FIG. 2 illustrates reflection of incident light by the grating light modulator adopting the electrostatic manner according to the conventional technology in an undeformed state.
Figure 3:
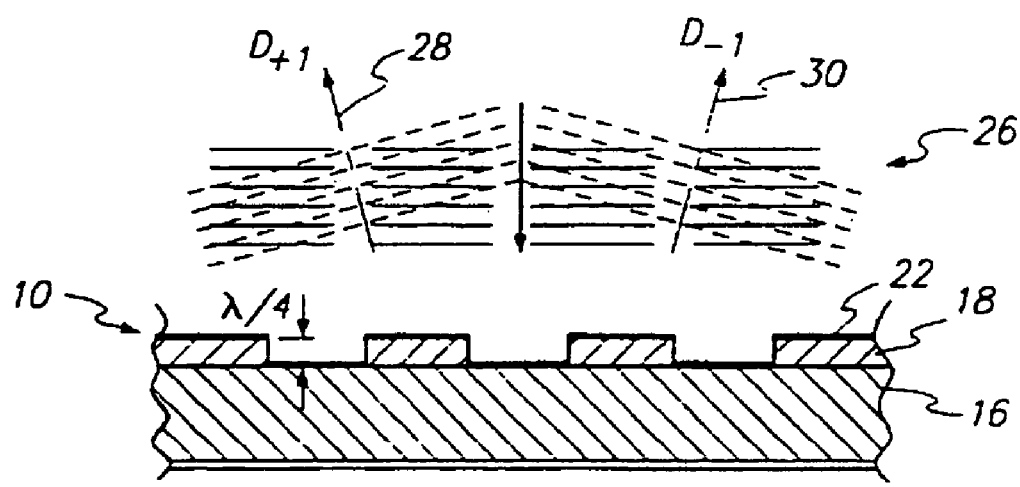
FIG. 3 illustrates diffraction of incident light by the grating light modulator according to the conventional technology in a deformed state caused by an electrostatic force.
Figure 4:
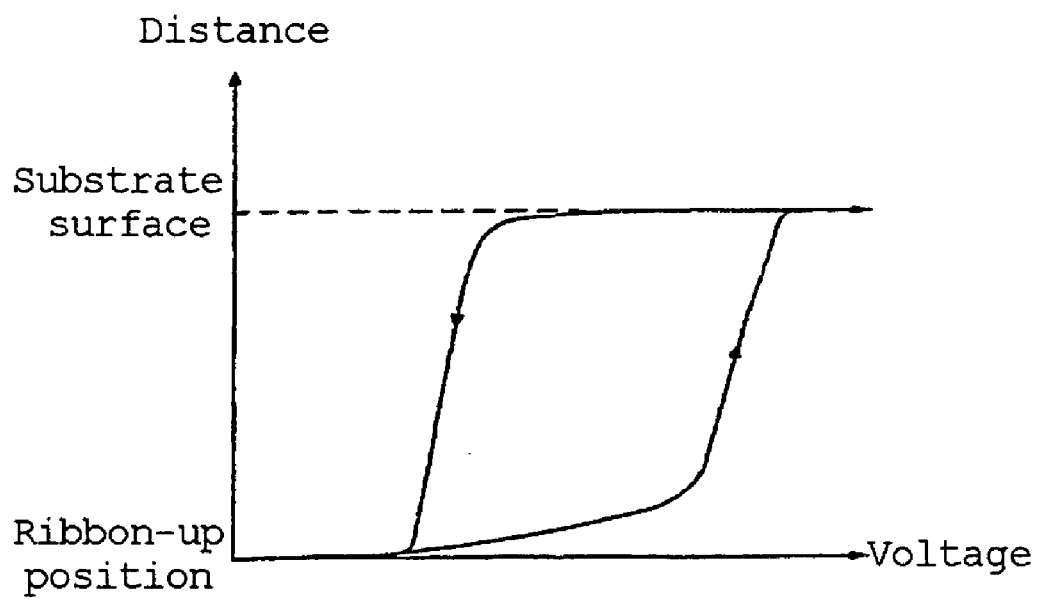
FIG. 4 illustrates a hysteresis curve for the grating light modulator adopting the electrostatic manner according to the conventional technology.
Figure 5:
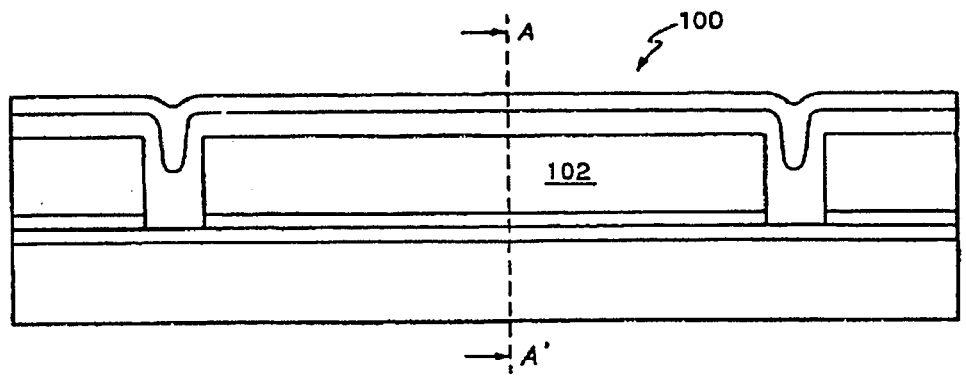
FIG. 5 is a side sectional view of a column-type diffractive grating light valve adopting an electrostatic manner according to a conventional improved technology.
Figure 6:
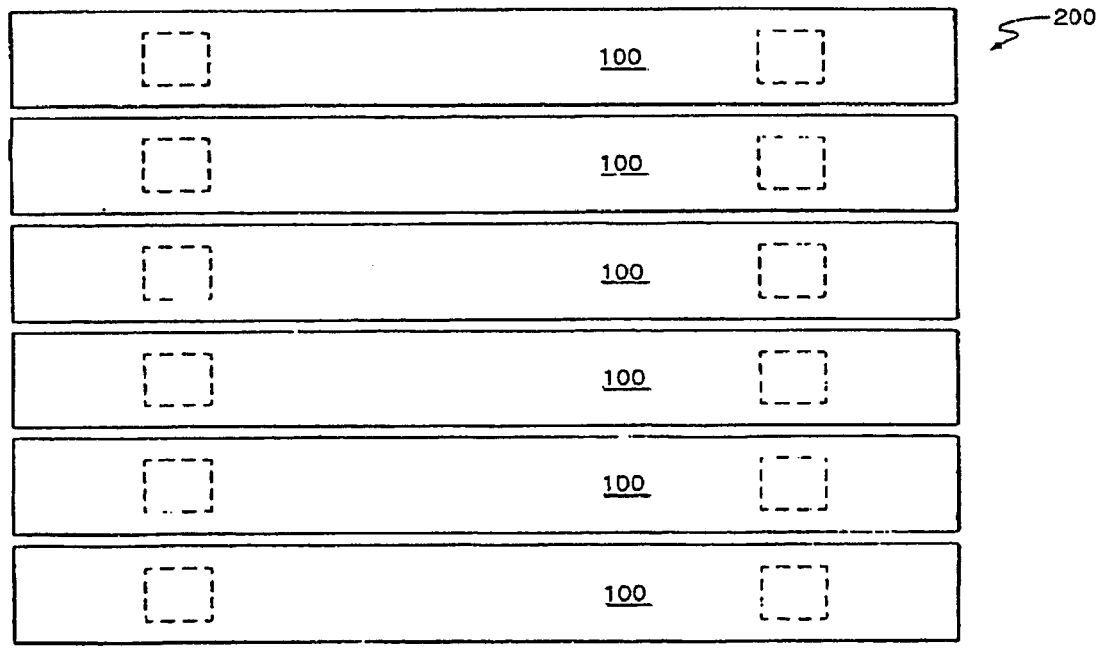
FIG. 6 is a plan view of a portion of the grating light valve (GLV) including six elongate elements corresponding to a single display element according to the conventional improved technology.
Figure 7:
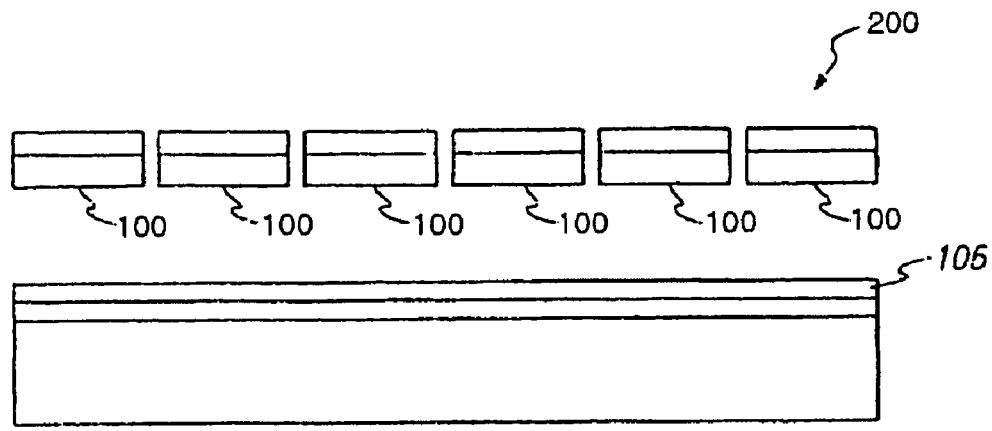
FIG. 7 is a front view of the display element of the GLV including the six elongate elements according to the conventional improved technology, which reflects incident light in an undeformed state.
Figure 8:
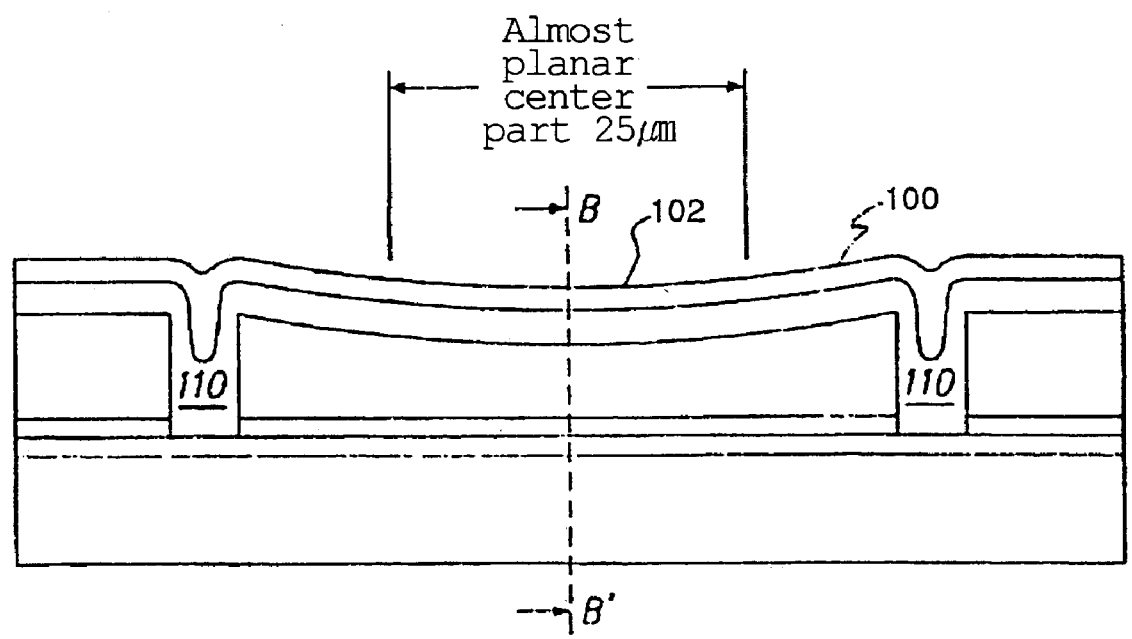
FIG. 8 is a side sectional view of an elongate element of the GLV according to the conventional improved technology, which is deformed by an electrostatic force.
Figure 9:
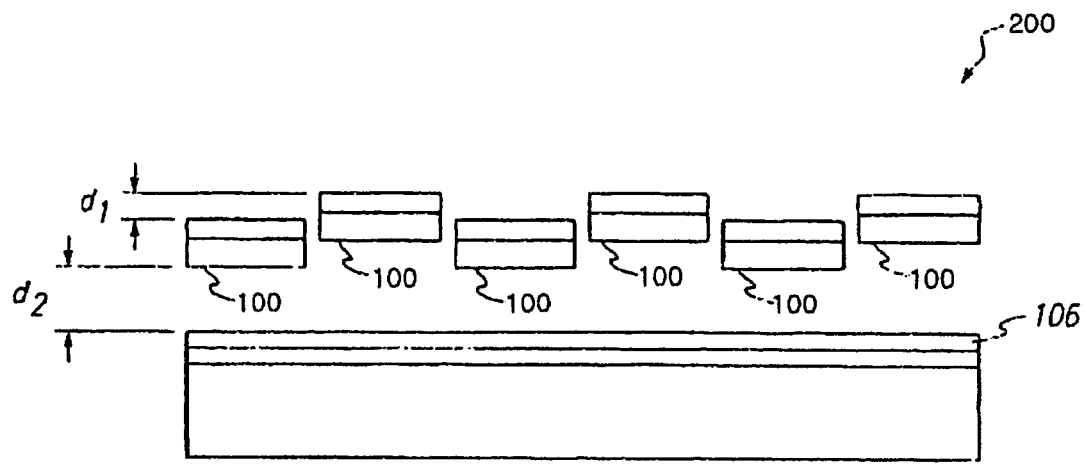
FIG. 9 is a front view of the display element of the GLV including the six elongate elements alternately arranged, which diffracts incident light in a deformed state caused by an electrostatic force according to the conventional improved technology.
Figure 10:
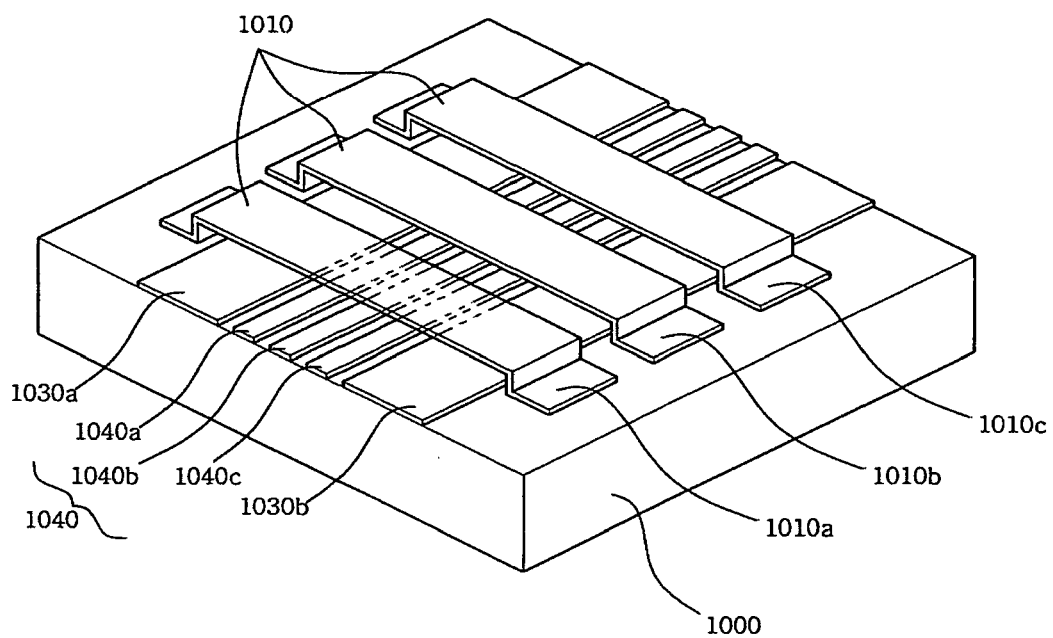
FIG. 10 is a perspective view of an electrostatic-type variable diffractive light modulator, according to an embodiment of the present invention.

FIG. 10 is a perspective view of an electrostatic-type variable diffractive light modulator, according to an embodiment of the present invention.

Referring to the drawing, the electrostatic-type variable diffractive light modulator according to this invention includes a glass substrate 1000, a plurality of reflective plates 1040a to 1040c attached to the glass substrate 1000, and a plurality of moving parts 1010a to 1010c.

The glass substrate 1000 is made of a light transmissive material to transmit incident light, thus transmitting incident light radiating from below and reflective light produced by the incident light.

The reflective plates 1040a to 1040c are provided on a surface of the glass substrate 1000 facing the moving parts 1010a to 1010c. In the drawing, the reflective plates 1040a to 1040c are arranged perpendicular to a longitudinal direction of the moving parts 1010a to 1010c such that the reflective plates 1040a to 1040c cross the moving parts 1010a to 1010c.

Further, a pair of lower electrodes 1030a and 1030b is provided on the surface of the glass substrate 1000 facing the moving parts 101a to 1010c such that the lower electrodes 1030a and 1030b are located on both sides of the reflective plates 1040a to 1040c.

In this case, since the lower electrodes 1030a and 1030b are placed on both sides of the reflective plates 1040a to 1040c, central portions of the moving parts 101a to 1010c maintain a flat state even when the moving parts 101a to 1010c move downward.

The flatness of the central portions of the moving parts 101a to 1010c is helpful to control light.

The construction of the reflective plates 1040a to 1040c is as follows. That is, the reflective plates 1040a to 1040c are arranged at an interval equal to a width of each of the reflective plates 1040a to 1040c or at an interval larger than the width thereof.

According to this embodiment, the reflective plates 1040a to 1040c are arranged perpendicular to the longitudinal direction of the moving parts 101a to 1010c. However, the reflective plates 1040a to 1040c may be arranged parallel to the longitudinal direction of the moving parts 101a to 1010c.

Each of the moving parts 101a to 1010c has a ribbon shape. Both ends of each of the moving parts 101a to 1010c are attached to the glass substrate 1000, and the central portion of each of the moving parts 101a to 1010c is spaced apart from the glass substrate 1000, thus ensuring a moving space.

In the drawing, the foremost moving part 1011a is transparent to illustrate the arrangement of the lower electrodes 1030a and 1030b and the reflective plates 1040a to 1040c provided on the glass substrate 1000. However, the moving part. 1010a is not transparent and does not transmit light.

Of course, the moving parts 101a to 1010c may be made of a light transmissive electrode material. In this case, the moving parts 1010a to 1010c are transparent.

Lower surfaces of the moving parts 101a to 1010c facing the glass substrate 1000 function as reflective surfaces to reflect incident light.

The moving parts 1010a to 1010c are made of conductive material to serve as upper electrodes, and thereby are more advantageous than the conventional technology.

As shown in the drawing, when a voltage is applied to the moving parts 1010a to 1010c and the lower electrodes 1030a and 1030b, the moving parts 1010a to 1010c move downward.

Conversely, when the voltage is released from the moving parts 1010a to 1010c and the lower electrodes 1030a and 1030b, the moving parts 1010a to 1010c move upward due to a restoring force.

Meanwhile, the incident light falls on the lower portion of the glass substrate 1000, and the reflective plates 1040a to 1040c reflect the incident light.

Further, the incident light passing through gaps between the reflective plates 1040a to 1040c is reflected on the lower surfaces of the moving parts 1010a to 1010c.

In such a state, when voltage is applied to the reflective plates 1040a to 1040c, the reflective plates 1040a to 1040c move downward due to electrostatic force. In this case, when a height difference is equal to an odd multiple of $\lambda/4$, diffracted light is produced from light reflected on the reflective plates 1040a to 1040c and the moving parts 1010a to 1010c.

Figure 11A:
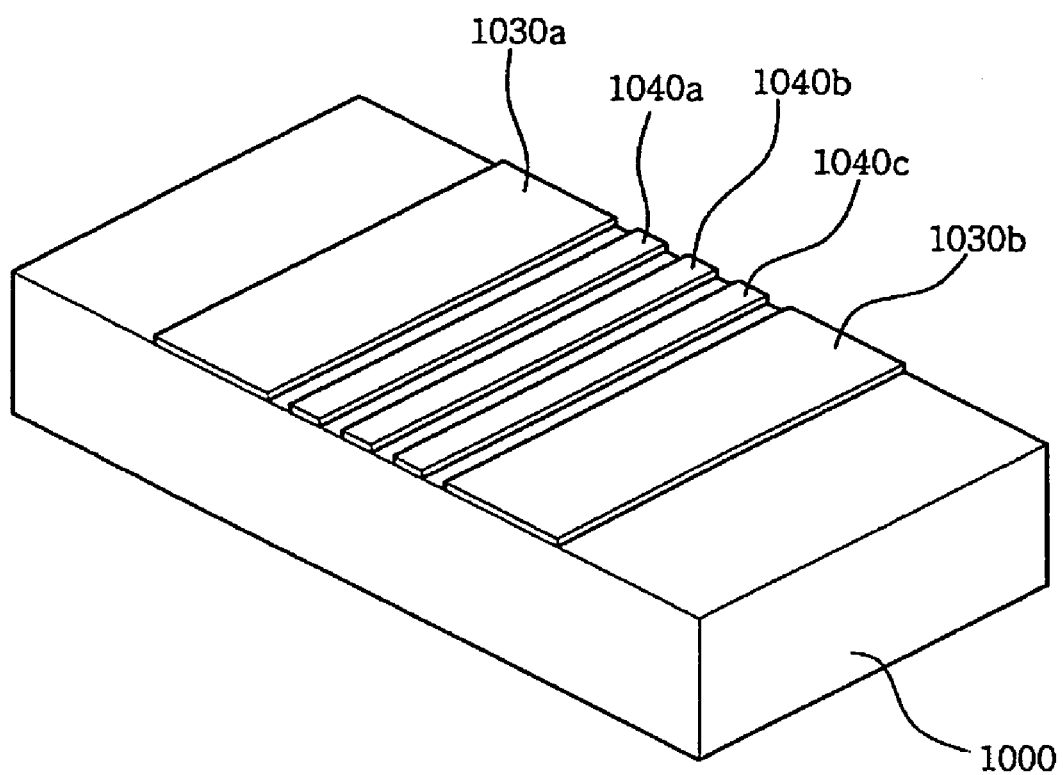
FIGS. 11a to 11g are perspective views to specific parts of the electrostatic-type variable diffractive light modulator of FIG. 10.
Figure 11B:
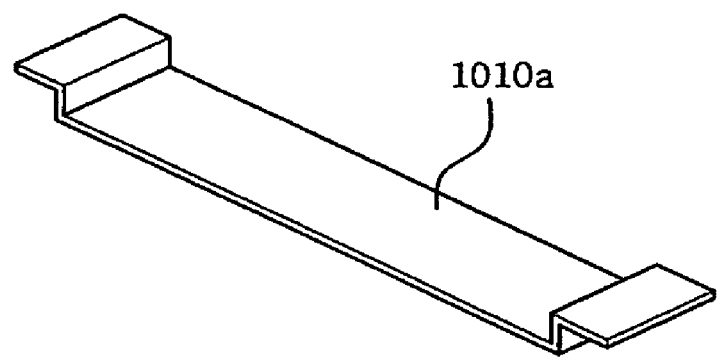

FIGS. 11a and 11b are perspective views to show specific parts of the electrostatic-type variable diffractive light modulator of FIG. 10.

FIG. 11a shows the state where the moving parts 1010a to 1010c are removed from the electrostatic-type variable diffractive light modulator. Referring to the drawing, the lower electrodes 1030a and 1030b are arranged on the upper surface of the glass substrate 1000, and the plurality of reflective plates 1040a to 1040c is arranged on a central portion of the glass substrate 1000.

FIG. 11b shows the moving part 1010a which is removed from the electrostatic-type variable diffractive light modulator and is inverted.

Referring to the drawing, the moving part 1010a has the shape of a ribbon, and a central portion of the moving part 1010a is depressed. The depressed part serves as a reflective surface to reflect the incident light.

Figure 11C:
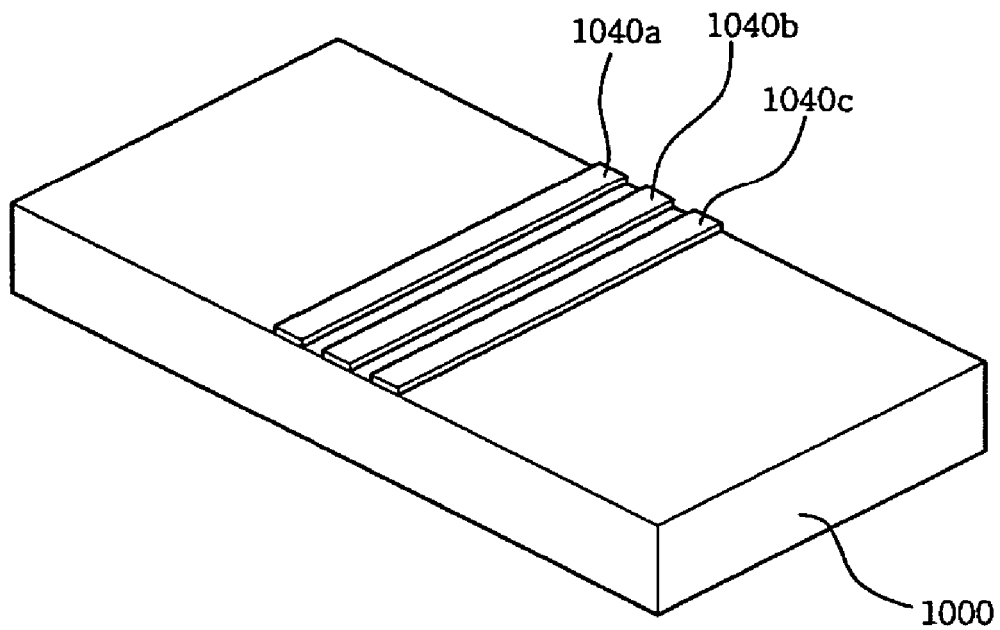

FIG. 11c is a perspective view to show another glass substrate and reflective plates used in this invention. Referring to the drawing, the glass substrate 1000 comprises a light transmissive electrode. Thus, the lower electrodes 1030a and 1030b shown in FIG. 11a are not required.

Figure 11D:
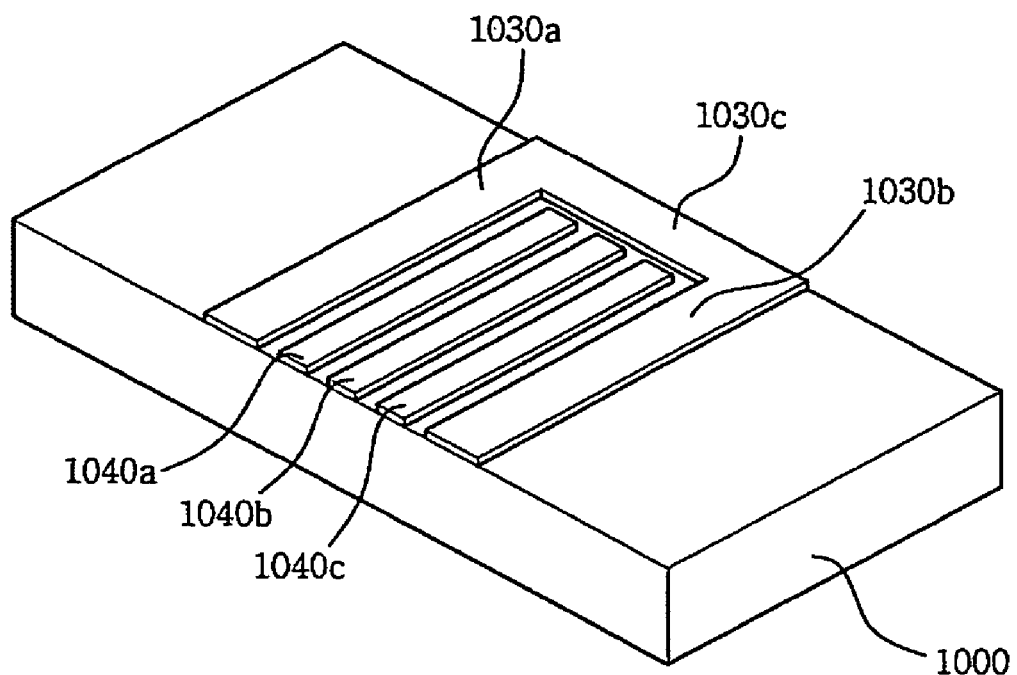

FIG. 11d is a perspective view to show still another glass substrate and reflective plates used in this invention. Referring to the drawing, a left lower electrode 1030a and a right lower electrode 1030b attached to the glass substrate 1000 are electrically connected to each other via a connection plate 1030c. Such a construction reduces the limits to a design, because an external signal line for the lower electrodes is connected to only one of the left lower electrode 1030a and the right lower electrode 1030b.

Figure 11E:
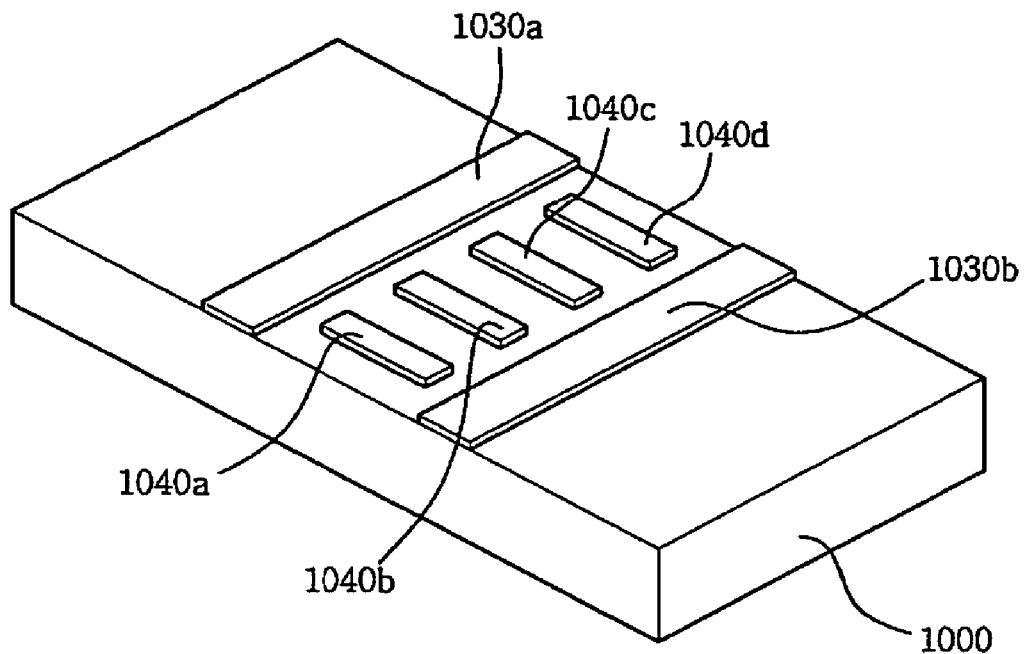

FIG. 11e is a perspective view to show still another glass substrate and reflective plates used in this invention. Referring to the drawing, the reflective plates 1040a to 1040d attached to the glass substrate 1000 are arranged parallel to a longitudinal direction of the moving parts 1010a to 1010c. Thus, the glass substrate and the reflective plates shown in FIG. 11e are different from those shown in FIG. 11a in the formation direction of diffracted light. That is, in the case of the glass substrate and the reflective plates of FIG. 11e, diffracted light is produced in a direction perpendicular to that of the FIG. 11a. Therefore, the glass substrate and the reflective plates of FIG. 11e are used for different purposes than those of FIG. 11a.

Figure 11F:
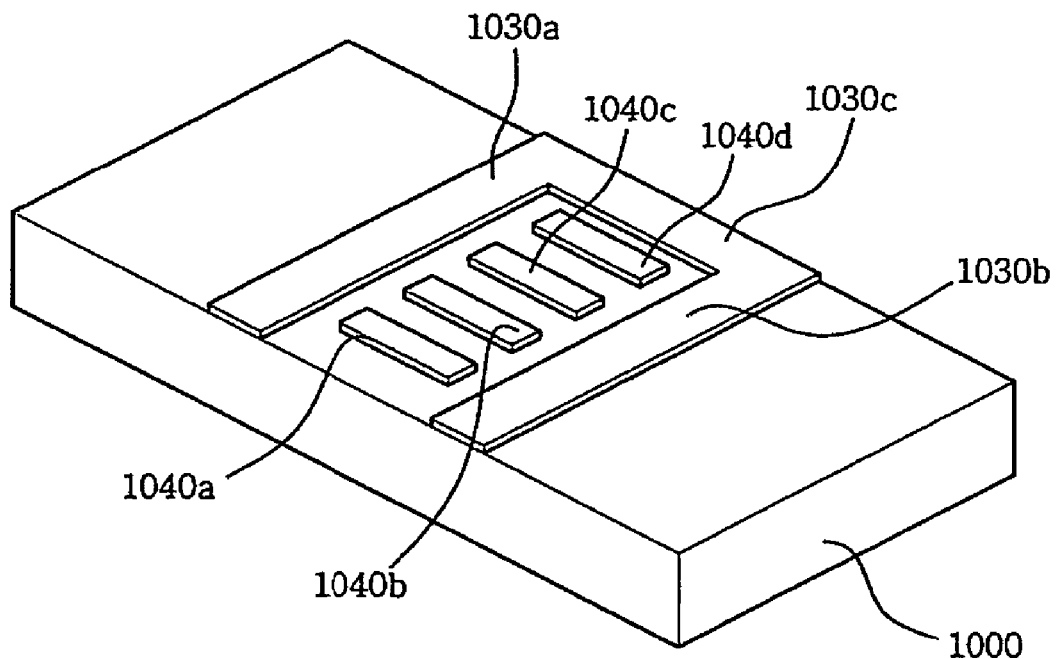

FIG. 11f is a perspective view to show still another glass substrate and reflective plates used in this invention. When comparing the glass substrate and the reflective plates of FIG. 11f with those of FIG. 11e, a left lower electrode 1030a is electrically connected to a right lower electrode 1030b via a connection plate 1030c. Such a construction reduces the limits to a design, because an external signal line for the lower electrodes is connected to only one of the left lower electrode 1030a and the right lower electrode 1030b.

Figure 11G:
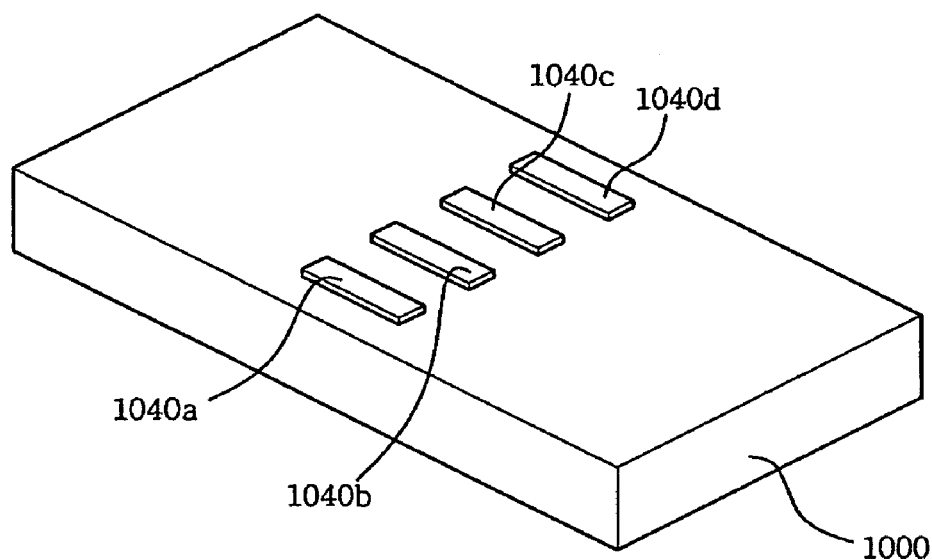

FIG. 11g is a perspective view to show still another glass substrate and reflective plates used in this invention. The glass substrate and the reflective plates of FIG. 11g are different from those of FIG. 11e and 11f in that the glass substrate 1000 comprises a light transmissive electrode and a lower electrode is not additionally required.

Figure 11H:
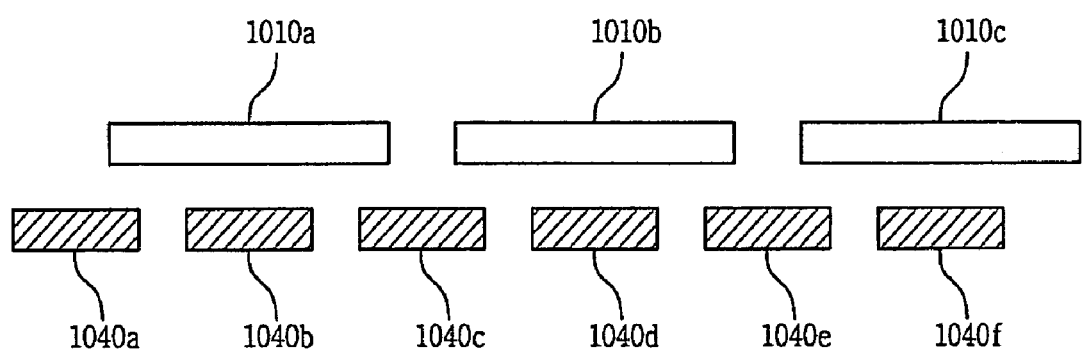
FIG. 11h is a sectional view to show an arrangement of moving parts and reflective plates of the electrostatic-type variable diffractive light modulator, according to the present invention.
Figure 11I:
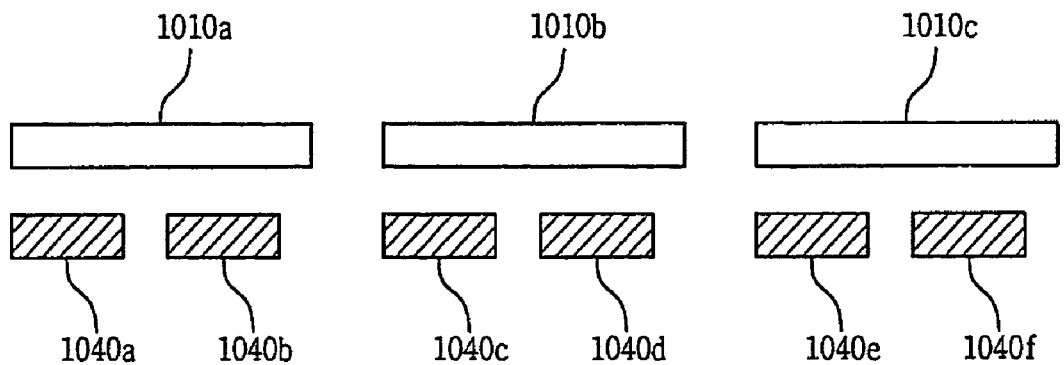
FIG. 11i is a sectional view to show another arrangement of moving parts and reflective plates of the electrostatic-type variable diffractive light modulator, according to the present invention.

FIG. 11h is a sectional view to show an arrangement of the moving parts and reflective plates of the electrostatic-type variable diffractive light modulator, according to the present invention.

Referring to the drawing, the reflective plates 1040a to 1040f close gaps between the moving parts 1010a to 1010c. In a detailed description, a reflective plate denoted by 1040c is positioned under a gap between the moving part denoted by reference numeral 1010a and the moving part denoted by reference numeral 1101b. Thereby, light passing through the gap between the moving parts 1010a and 1010b is reflected on the reflective plate 1040c. Accordingly, the gaps between the moving parts 1010a to 1010c can be controlled as desired when manufacturing the moving parts 1010a to 1010c.

FIG. 11h is a sectional view to show another arrangement of the moving parts and the reflective plates of the electrostatic-type variable diffractive light modulator, according to the present invention.

Referring to the drawing, the reflective plates 1040a to 1040f are placed under the moving parts 1010a to 1010c. In a detailed description, the reflective plates denoted by reference numerals 1040a and 1040b are placed under the moving part denoted by reference numeral 1010a, and the reflective plates denoted by reference numerals 1040c and 1040d are placed under the moving part denoted by reference numeral 1101b, and the reflective plates denoted by reference numerals 1040e and 1040f are placed under the moving part denoted by reference numeral 1010c.

Figure 12A:
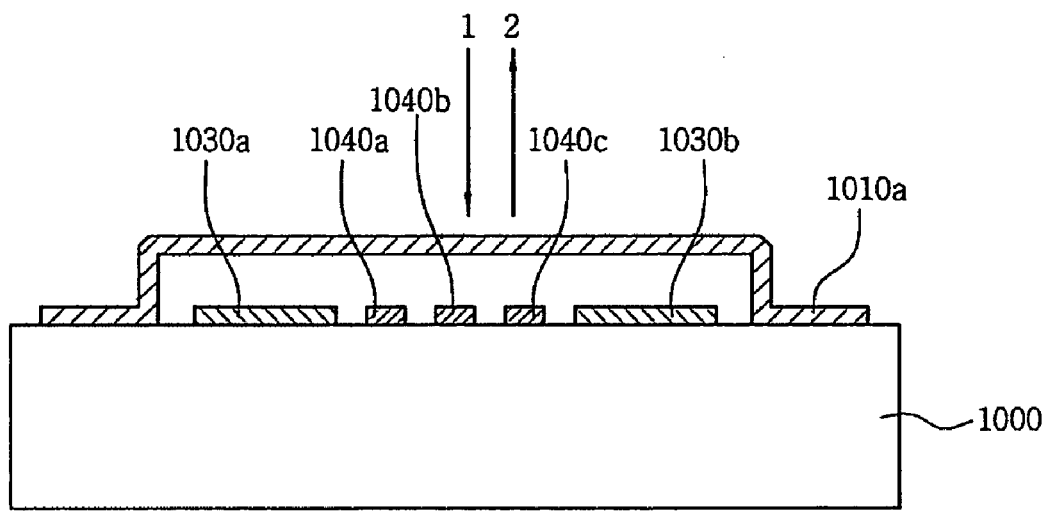
FIGS. 12a and 12b are views to illustrate operation of the electrostatic-type variable diffractive light modulator, according to the present invention.
Figure 12B:
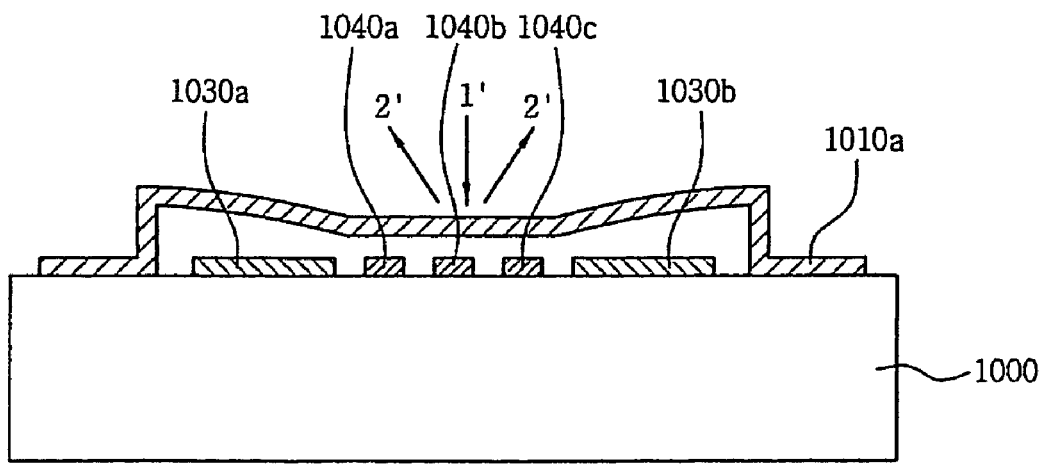

FIGS. 12a and 12b are views to illustrate the operation of the electrostatic-type variable diffractive light modulator, according to the present invention.

Referring to FIG. 12a, when voltage is not applied to the moving part 1010a and the lower electrodes 1030a and 1030b, a height difference of λ/4 is not formed between the reflective plates 1040a to 1040c and the reflective surface provided on the lower surface of the moving part 101a, so that reflected light produced by incident light has a higher intensity than diffracted light generated adjacent to the reflected light.

Meanwhile, referring to FIG. 12b, when voltage is applied to the moving part 1010a and the lower electrodes 1030a and 1030b, a height difference of λ/4 is formed between the reflective plates 1040a to 1040c and the reflective surface provided on the lower surface of the moving part 1010a, so that diffracted light produced by incident light has a higher intensity than reflected light. Thereby, the diffracted light can be obtained.

FIGS. 13a to 13j are diagrams to illustrate a method of manufacturing the electrostatic-type variable diffractive light modulator, according to the present invention.

Figure 13A:
FIGS. 13a to 13j are diagrams to illustrate a method of manufacturing the electrostatic-type variable diffractive light modulator, according to the present invention.

Referring to FIG. 13a, a glass substrate 1400, which is made of a light transmissive material, is prepared. In this case, anti-reflection coating layers may be formed on both surfaces of the light transmissive material.

Figure 13B:
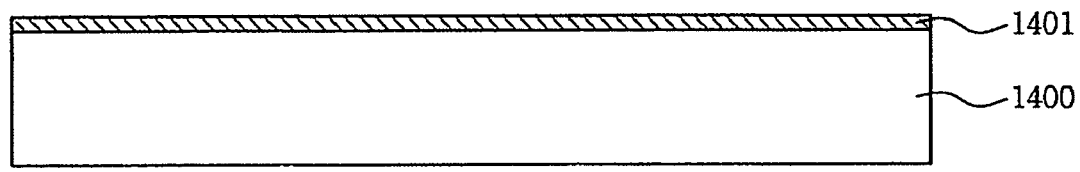

As shown in FIG. 13b, metal is deposited on the glass substrate 1400 in a thickness of 0.01~3 μm through a sputtering or evaporation method to form the lower electrodes and the reflective plates. In this case, the metal is selected out of Pt, Ta/Pt, Ni, Au, Al, RuO$_2$, etc.

Figure 13C:
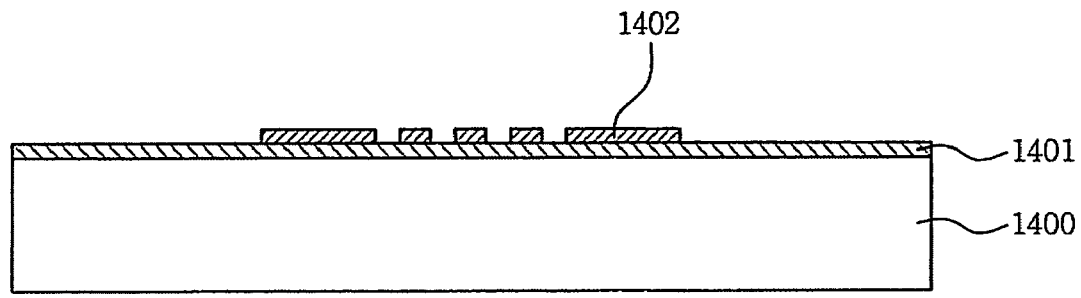

Referring to FIG. 13c, a photoresist film 1402 is deposited on a metal layer 1401, and then exposed and patterned. Thereafter, the photoresist film 1402 is etched to leave the lower electrodes and the reflective plates.

Figure 13D:
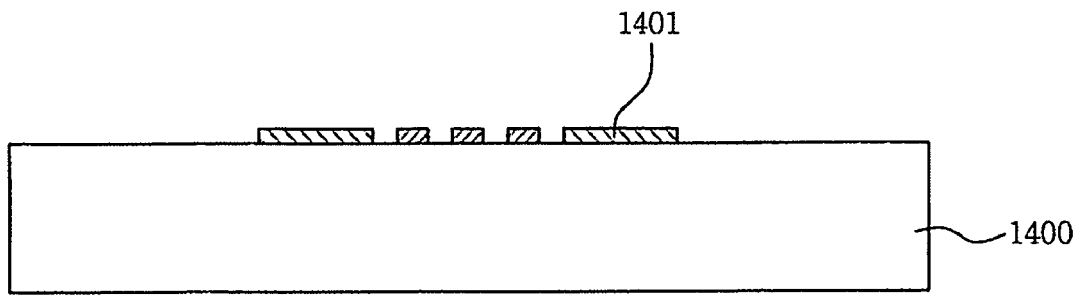

As shown in FIG. 13d, the lower electrodes and the plurality of reflective plates are formed through a wet process (screen printing, Sol-Gel coating, etc.) or a dry process (sputtering, evaporation, vapor deposition) according to a pattern formed on the photoresist film 1402. Subsequently, the photoresist film 1402 is eliminated.

Figure 13E:
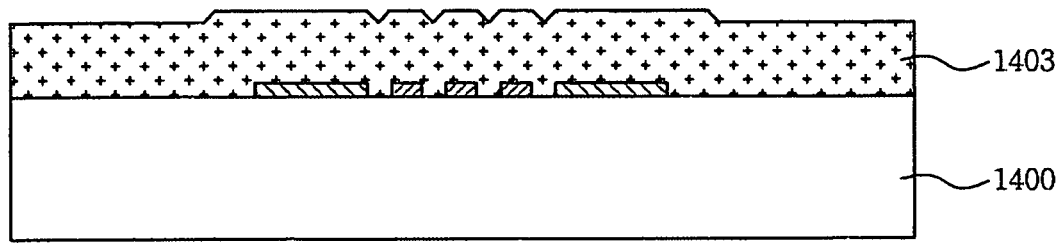
Figure 13F:
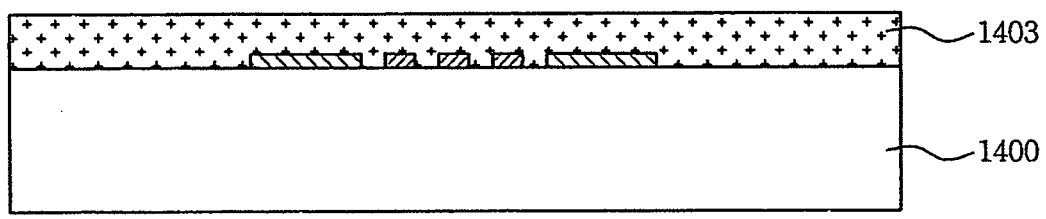

Referring to FIG. 13e, a polycrystalline silicon layer 1403 to be used as a sacrificial layer is formed on the metal layer 1401 with the lower electrodes and the reflective plates, through a PECVD (Plasma Enhanced Chemical Vapor Deposition) or the like. As shown in FIG. 13f, the sacrificial layer is planarized, thus forming the polycrystalline silicon layer 1403 in a predetermined height.

Figure 13G:
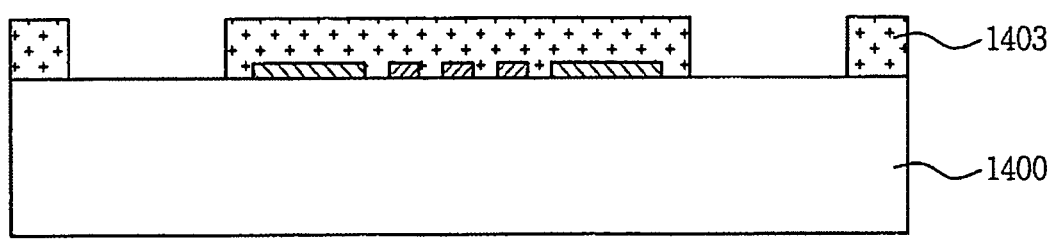

Referring to FIG. 13g, a patterned photoresist film (not shown) is deposited on the polycrystalline silicon layer 1403 in the predetermined height. Thereafter, the photoresist film is exposed and etched, thus forming polycrystalline silicon layer 1403 to have a shape equal to that of lower portion of the moving part.

Figure 13H:
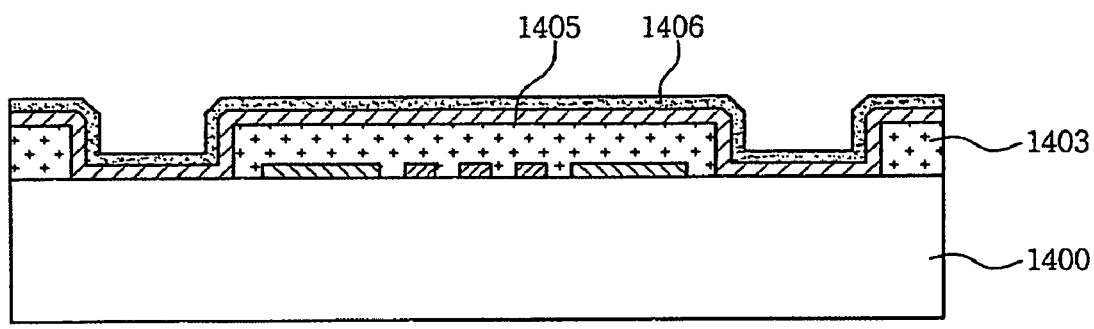

Referring to FIG. 13h, a reflective metallic thin-film 1405 having high reflectivity is deposited on the moving parts formed by exposing and etching the photoresist film. A structural metallic thin-film 1406 made of reflective metal having a high Young's modulus, such as W, Mo. Ta, Ti, etc., is deposited on the reflective metallic thin-film 1405.

Figure 13I:
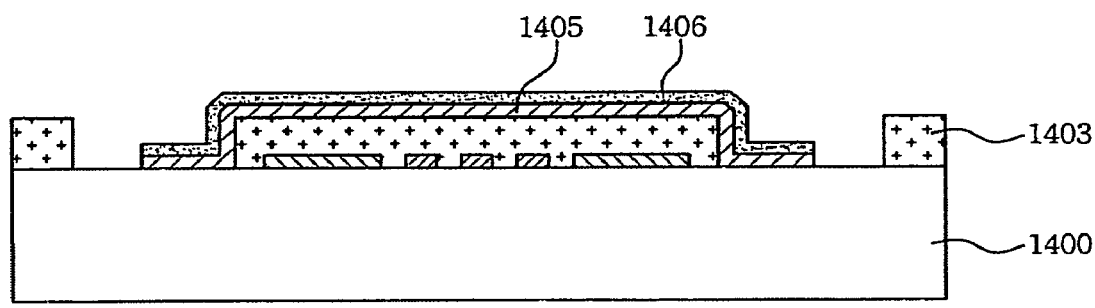

Subsequently, as shown in FIG. 13i, the exposure is carried out again, and the reflective metallic thin film 1405 and the structural metallic thin-film 1406 are etched.

Figure 13J:
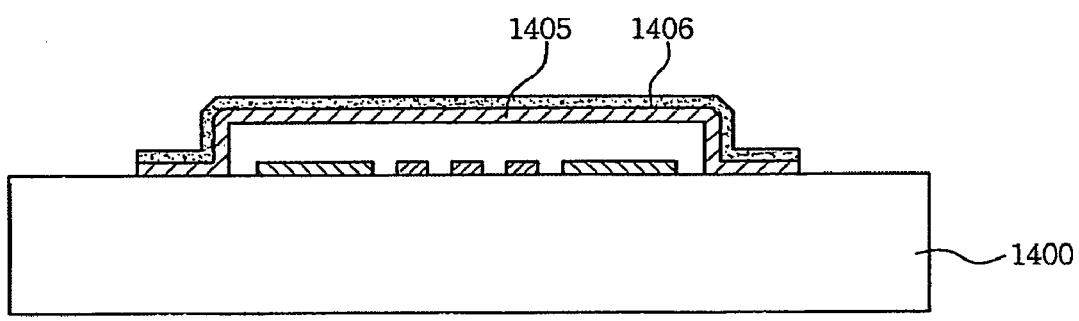

Next, as shown in FIG. 13j, the sacrificial layer located between the glass substrate 1400 and the reflective metallic thin-film 1405 is eliminated.

As described above, the present invention allows a large tolerance for a gap during operation when a width of an upper grating is larger than the gap between micromirrors, and prevents the capacity of a copper-foil of a light modulator from deteriorating, even though a reflective surface around an edge of the gap is rough due to operation.

Further, the present invention prevents diffraction efficiency from being reduced due to a gap between micromirrors.

The present invention allows an upper static grating to have a very small pitch, thus allowing several sub-pixels to be included in one pixel, thereby enhancing image contrast.

Further, the present invention forms one pixel with a single micro actuator, so that the uniformity of beams in the pixel or between the pixels is increased, compared to the conventional method.

Further, according to the present invention, reflective plates, which are moved by an electrostatic force generated due to an application of voltage, are not made of a dielectric material but are made of metal, so that electric charges are continuously supplied to the reflective plates, thus preventing variation in electrostatic force.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrostatic-type variable diffractive light modulator, comprising:
 a light transmissive plate to transmit light;
 a plurality of first reflective plates attached to an upper surface of the light transmissive plate to be arranged in a row, each of the first reflective plates having a first reflective surface on a light transmissive plate contact surface thereof;
 a plurality of second reflective plates provided above the first reflective plates to be spaced apart from the first reflective plates at a predetermined interval while being arranged in a row, each of the second reflective plates having a second reflective surface to reflect incident light radiating below; and
 an actuating unit to actuate the second reflective plates using an electrostatic force so that the second reflective plates are moved between a first position wherein the first reflective surfaces and the second reflective surfaces form a plane mirror, and a second position wherein the first and second reflective surfaces diffract the incident light.

2. The electrostatic-type variable diffractive light modulator according to claim 1, wherein the actuating unit comprises:
 a lower electrode provided by the light transmissive plate made of a light transmissive electrode material; and
 an upper electrode provided by each of the second reflective plates made of an electrode material, so that the upper electrode moves vertically due to an electrostatic force generated between the upper and lower electrodes when a voltage is applied.

3. The electrostatic-type variable diffractive light modulator according to claim 1, wherein the actuating unit comprises:
 a pair of lower electrodes attached to the upper surface of the light transmissive plate so that the lower electrodes are positioned on both sides of the first reflective plates while crossing the second reflective plates; and
 an upper electrode provided by each of the second reflective plates made of an electrode material, so that the upper electrode moves vertically due to an electrostatic force generated between the upper and lower electrodes when a voltage is applied.

4. The electrostatic-type variable diffractive light modulator according to claim 3, further comprising:
 a connection plate attached to an end of the upper surface of the light transmissive plate, thus electrically connecting the lower electrodes to each other.

5. The electrostatic-type variable diffractive light modulator according to claim 1, wherein the first reflective plates are parallel to the second reflective plates.

6. The electrostatic-type variable diffractive light modulator according to claim 1, wherein the first reflective plates are perpendicular to the second reflective plates.

7. The electrostatic-type variable diffractive light modulator according to claim 5, wherein the light transmissive plate is arranged such that parts of the upper surface thereof free from the first reflective plates are located under the second reflective plates.

8. A method of manufacturing an electrostatic-type variable diffractive light modulator, comprising:
 a first step of forming a lower electrode and a plurality of reflective plates through an exposure, after depositing a metal layer on a light transmissive material;
 a second step of depositing a sacrificial layer on the light transmissive material, and planarizing and etching the sacrificial layer;
 a third step of depositing a reflective metallic thin-film on a surface of the sacrificial layer; and
 a fourth step of eliminating the sacrificial layer formed at the second step.

9. The method of manufacturing the electrostatic-type variable diffractive light modulator according to claim 8, further comprising:
 forming anti-reflection coating layers on both surfaces of the light transmissive material of the first step.

10. The method of manufacturing the electrostatic-type variable diffractive light modulator according to claim 8, further comprising:
 a fifth step of depositing a structural metallic thin-film made of reflective metal on the reflective metallic thin-film.

11. The method of manufacturing the electrostatic-type variable diffractive light modulator according to claim 9, further comprising:
 a fifth step of depositing a structural metallic thin-film made of reflective metal on the reflective metallic thin-film.

* * * * *